(12) United States Patent
Akiyama

(10) Patent No.: US 9,430,946 B2
(45) Date of Patent: Aug. 30, 2016

(54) OBSTACLE DETERMINATION DEVICE

(75) Inventor: Tomonori Akiyama, Susono (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 14/369,067

(22) PCT Filed: Dec. 28, 2011

(86) PCT No.: PCT/JP2011/080409
§ 371 (c)(1),
(2), (4) Date: Jun. 26, 2014

(87) PCT Pub. No.: WO2013/098995
PCT Pub. Date: Jul. 4, 2013

(65) Prior Publication Data
US 2014/0361882 A1   Dec. 11, 2014

(51) Int. Cl.
*B60Q 1/00* (2006.01)
*G08G 1/16* (2006.01)
*G06K 9/00* (2006.01)

(52) U.S. Cl.
CPC ............. *G08G 1/16* (2013.01); *G06K 9/00798* (2013.01); *G06K 9/00805* (2013.01); *G08G 1/165* (2013.01); *G08G 1/167* (2013.01)

(58) Field of Classification Search
CPC ..................... G06K 9/00798; G06K 9/00805; G08G 1/16; G08G 1/165; G08G 1/167; G01S 13/343; G01S 13/42; G01S 13/931; G01S 2013/9321; G01S 7/295; G01S 7/412
USPC ........ 340/435–441, 443–448, 457, 463, 466, 340/935, 936, 937, 938, 939, 951, 971
See application file for complete search history.

(56) References Cited

U.S. PATENT DOCUMENTS

| 5,701,122 A * | 12/1997 | Canedy ................. B60Q 9/007 340/435 |
| 6,233,499 B1 * | 5/2001 | Matsumoto ......... B29C 33/3835 700/118 |
| 6,429,420 B1 * | 8/2002 | Babst .................... B60Q 9/005 180/232 |
| 2004/0105169 A1 * | 6/2004 | Togashi ............... G11B 7/1353 359/719 |
| 2008/0198226 A1 * | 8/2008 | Imamura ............ G06K 9/00805 348/148 |
| 2009/0268027 A1 * | 10/2009 | Yang ........................ B60R 1/00 348/148 |

FOREIGN PATENT DOCUMENTS

| CN | 102170558 A | 8/2011 |
| JP | 2000-305625 A | 11/2000 |
| JP | 2009-217728 A | 9/2009 |

* cited by examiner

*Primary Examiner* — Daniel Previl
(74) *Attorney, Agent, or Firm* — Sughrue Mion, PLLC

(57) ABSTRACT

An obstacle determination device that determines whether a solid object present in a travelling direction of a subject vehicle is an obstacle that the vehicle should avoid, and determines the solid object is an obstacle by comparing the height of the solid object to a reference height. The reference height is set based on a relative positional relation between a separation line detected by a separation line detection unit and the solid object. And, when the separation line is present between the solid object and the subject vehicle, the reference height is set such that the solid object is more likely to be determined as an obstacle, as compared to when the separation line is not present between the solid object and the subject vehicle.

6 Claims, 6 Drawing Sheets

OBSTACLE DETERMINATION DEVICE

CROSS REFERENCE TO RELATED APPLICATIONS

This application is a National Stage of International Application No. PCT/JP2011/080409, filed on Dec. 28, 2011, the contents of all of which are incorporated herein by reference in their entirety.

TECHNICAL FIELD

The present invention relates to a device for determining the presence of an obstacle in a travelling direction of a subject vehicle.

BACKGROUND ART

Conventionally, a technology that detects a solid object present ahead of a subject vehicle and warns the driver by a warning device or electrically operates a brake to avoid a collision with the solid object by the created braking force, when it is predicted that the subject vehicle may collide with the detected solid object, has been developed. In order to avoid a collision more reliably, it is necessary to quickly recognize the presence of an obstacle and to perform a collision determination. In the technology disclosed in Patent Literature 1, for example, when it is determined that an obstacle is present in a traveling lane, a collision determination is performed. On the other hand, when it is determined that the obstacle is not present in the traveling lane, a collision determination is performed only when it is expected that the subject vehicle deviates from the traveling lane. By doing so, it is intended that the number of processes required for the collision determination be reduced thus a quick determination be achieved.

CITATION LIST

Patent Literature 1: Japanese Patent Application Publication No. 2009-217728

SUMMARY OF INVENTION

Technical Problem

In an environment where a vehicle travels, when determining whether a solid object present in the travelling direction of the subject vehicle is an obstacle that the subject vehicle should avoid, the smaller the stature (height) of the solid object is, the lower the accuracy of the obstacle determination becomes. The reason for this is, for example, that the proportion of detection errors in the detected height of the solid object increases as the stature of the solid object becomes small. If a solid object is erroneously determined as an obstacle, it would essentially be necessary to control the subject vehicle in order to avoid a collision with the erroneously detected solid object and hence a smooth travel of the vehicle may be interrupted.

With the foregoing in view, an object of the present invention is to provide an obstacle determination device that determines the presence of an obstacle in the travelling direction of a subject vehicle and that can suppress a decrease in the accuracy of an obstacle determination.

Solution to Problem

In order to solve the problems, the present invention has focused on the fact that between the inside and the outside of a region (traveling lane) in which the subject vehicle travels, the height of a solid object which can be an obstacle is substantially different. In general, from the aspect of securement of the road safety, it is unlikely that any obstacle that interferes with the travel of the vehicle is present in a traveling lane. Thus, if an obstacle is present in the traveling lane, it can be considered that a solid object that can be an obstacle has a certain degree of height since such solid object may be placed for the purpose of road construction or the like. On the other hand, since it is not basically intended for a vehicle to travel on the outside of the traveling lane, relatively short obstacle such as curbs, guard rails, or the like may be present on the outside. Thus, there is a situation where the height of a solid object which can be an obstacle to a vehicle may be substantially different between the inside and the outside of the traveling lane of the vehicle.

Thus, in the present invention, an obstacle determination device for determining whether a solid object recognized in a travelling direction of a subject vehicle is an obstacle that the subject vehicle should avoid employs a configuration in which a reference height used for making an obstacle determination is changed based on a relative positional relation between the solid object and a separation line on a road indicating a boundary of the traveling lane of the subject vehicle. With this configuration, in principle, such determination process that may produce an erroneous determination will be carried out limitedly during the obstacle determination.

Specifically, the present invention provides an obstacle determination device that determines whether a solid object present in a travelling direction of a subject vehicle is an obstacle that the vehicle should avoid, the obstacle determination device comprising: a recognition unit that recognizes a solid object present in the travelling direction of the subject vehicle; a separation line detection unit that detects a separation line on a road indicating a boundary of a traveling lane of the subject vehicle; and an obstacle determination unit that determines whether the solid object is an obstacle by comparing the height of the solid object recognized by the recognition unit to a reference height. The reference height is set based on a relative positional relation between the separation line detected by the separation line detection unit and the solid object recognized by the recognition unit, and the reference height is set such that the solid object is more likely to be determined as an obstacle by the obstacle determination unit when the separation line is present between the solid object and the subject vehicle, as compared to when the separation line is not present between the solid object and the subject vehicle.

In the obstacle determination device according to the present invention, when the recognition unit recognizes the presence of a solid object in the travelling direction of the subject vehicle, the obstacle determination unit compares the height of the solid object to the reference height to determine whether the solid object is an obstacle that should be avoided. It is less likely, in the first place, that a solid object (obstacle) that the vehicle may potentially collide with is placed in a region, i.e. the traveling lane, in which the vehicle is expected to travel. Thus, if there is a case where an obstacle is present in the travelling direction, it may be limited to a case where the obstacle is placed for the purpose of road construction or the like, and hence, in such case, the obstacle is considered to be relatively tall. On the other hand, on the outside of the traveling lane, relatively short objects such as curbs or guard rails for preventing a vehicle from deviating from the traveling lane to enter the region may be present as obstacles. Thus, it can be considered that a requirement for a solid object to be an obstacle is different between the inside and the outside of a travelling region of the vehicle. Based on this consideration, in the obstacle determination device according to the present invention, it is expected that, by changing the reference height for making the obstacle determination between the inside and the outside of the travelling region of the vehicle, an accurate obstacle determination can be achieved.

More specifically, the reference height for making obstacle determination is set based on the relative positional relation between the separation line detected by the separation line detection unit and the solid object recognized by the recognition unit. The separation line detection unit detects a separation line (in general, white lines or the like) indicating the boundary of the traveling lane i.e. the region in which the vehicle travels. The relative positional relation between the separation line and the solid object indicates, in a way, whether the recognized solid object is positioned on the inside or the outside of the traveling lane of the subject vehicle. When the separation line is present between the subject vehicle and the solid object, it means that the solid object is positioned on the outside of the traveling lane of the subject vehicle. On the other hand, when the separation line is not present between the subject vehicle and the solid object, the solid object is at least present in the traveling lane of the subject vehicle. Thus, in the obstacle determination device according to the present invention, the reference height for determining the solid object as an obstacle is changed depending on whether the separation line is present between the recognized solid object and the subject vehicle. Specifically, when the separation line is present between the subject vehicle and the solid object, the reference height is set to be different from that of when the separation line is not present between the subject vehicle and the solid object so that the solid object is more likely to be determined as an obstacle that is present on the outside of the traveling lane where a relatively short obstacle may be present.

Here, as an example in which the reference height for making an obstacle determination is set to be different so that the solid object is more likely to be determined as an obstacle, a configuration in which, when at least one separation line is detected by the separation line detection unit, the reference height is set to a first reference height in a case where the separation line is not present between the solid object and the subject vehicle, and the reference height is set to a second reference height that is lower than the first reference height in a case where the separation line is present between the solid object and the subject vehicle, may be employed.

According to such a configuration, when the separation line is not present between the solid object and the subject vehicle, namely when it is assumed that the recognized solid object is present in the traveling lane of the subject vehicle, the reference height is set to the first reference height. Moreover, when the separation line is present between the solid object and the subject vehicle, namely when it is assumed that the recognized solid object is present on the outside of the traveling lane of the subject vehicle, the reference height is set to the second reference height that is lower than the first reference height. As described, when it is assumed that the solid object is present on the outside of the traveling lane, the solid object is more likely to be determined as an obstacle by setting a lower value as a threshold (reference height) for the obstacle determination. In other words, when it is assumed that the solid object is present on the inside of the traveling lane, the solid object is less likely to be determined as an obstacle. As a result, the occasions where an erroneous obstacle detection is comparatively likely to occur can be limited in a case where the reference height is set so that the solid object is more likely to be determined as an obstacle, i.e. a case where the solid object is present on the outside of the traveling lane. Accordingly, an erroneous determination by the obstacle determination device can be suppressed. This can be considered to contribute to both an obstacle avoidance and a smooth travel by the subject vehicle.

In the obstacle determination device, when the separation line detection unit detects two separation lines, one on each left and right sides of the subject vehicle, the reference height may be set to the first reference height in a case where the solid object is present in a region between the two separation lines, and the reference height may be set to the second reference height in a case where the solid object is not present in the region between the two separation lines. According to this configuration, when the solid object is present in the region interposed between the two separation lines it means that no separation line is present between the subject vehicle and the solid object. Thus, in this case, the reference height is set to the first reference height. On the other hand, when the solid object is not present in the region interposed between the two separation lines, it means that the separation line is present between the subject vehicle and the solid object. Thus, in this case, the reference height is set to the second reference height. As a result, the reference height is set to be lower so that the solid object is more likely to be determined as an obstacle by the obstacle determination unit only when the solid object is present on the outside of the traveling lane. Thus, the chances of an erroneous determination can be limited.

Moreover, there may be a case where only one separation line is detected by the separation line detection unit instead of one on each left and right sides of the subject vehicle to make a total of two. Here, an obstacle determination when a separation line is detected on any one of the left and right sides of the subject vehicle will be described. Specifically, in the above described obstacle determination device, when the separation line detection unit detects, on any one of left and right sides of the subject vehicle, one separation line in between the subject vehicle and the solid object, the reference height for an obstacle determination of the solid object may be changed based on whether the solid object is positioned in the travelling direction of the subject vehicle. As described, when one separation line is detected and this separation line is present between the subject vehicle and the solid object, it can be determined that the solid object is highly likely to be present on the outside of the traveling lane of the subject vehicle. However, in this case, the possibility of the subject vehicle to collide with the solid object differs depending on whether the solid object is positioned in the travelling direction of the subject vehicle. That is, it can be considered that the possibility of the subject vehicle to collide with the solid object is high if the solid object is present in the travelling direction of the subject vehicle. In contrast, it can be considered that the possibility of the subject vehicle to collide with the solid object is low if the solid object is not present in the travelling direction of the subject vehicle. Thus, by changing the reference height for determining the solid object as an obstacle which the subject vehicle should avoid depending on the possibility of a collision, it becomes possible to suppress erroneous determinations of the obstacle determination device, and to accurately determine and avoid an obstacle. As one alternative method, in the obstacle determination device, when the separation line detection unit detects, on any one of left and right sides of the subject vehicle, one separation line in between the subject vehicle and the solid object, the reference height for determining whether the solid object is an obstacle may be changed based on whether the detected separation line is positioned in the travelling direction of the subject vehicle.

Regarding the changing of the reference height depending on the possibility of a collision, for example, when the solid object is positioned in the travelling direction of the subject vehicle or when the detected separation line is positioned in the travelling direction of the subject vehicle, the reference height may be configured to be set to the second reference height. In such a configuration, it can be considered that, by reason that the recognized solid object is positioned in the travelling direction of the subject vehicle, there is a possibility that the subject vehicle may collide with the solid object. Thus, in such a case, in order to prioritize the avoidance of a collision with the solid object, the solid object is determined as an obstacle if the height of the solid object is higher than the second reference height, and then a necessity to avoid a collision of the subject vehicle with the solid object is recognized according to the determination result. Meanwhile, in a case where the recognized solid object is not positioned in the travelling direction of the subject vehicle or the like, the reference height for making an obstacle determination for the solid object may be set to either the first reference height or the second reference height. However, since it is considered that the possibility of the subject vehicle to collide with the solid object is low for the reason that the solid object is not positioned in the travelling direction, it is preferable to set the reference height for making an obstacle determination to the first reference height in order to suppress erroneous obstacle detections.

The present invention can be understood as a system that, according to the result of the determination by the obstacle determination device, performs a driving assist such as avoiding a collision of the subject vehicle with the solid object that is determined as an obstacle. For example, when the presence of a solid object in the travelling direction of the vehicle is recognized by the recognition unit, and the solid object is determined as an obstacle that the vehicle should avoid by the obstacle determination unit, the driving assist system acquires a track along which the subject vehicle should travel in order to avoid a collision and performs a control of turning and braking by the subject vehicle so as to follow the track or a warning to inform the necessity of an avoidance of the collision to the driver of the subject vehicle. In such a driving assist system, suppressing a decrease in the obstacle determination accuracy can contribute to a smooth travel and a reliable collision avoidance by the subject vehicle.

Advantageous Effects of Invention

According to the present invention, it is possible to provide an obstacle determination device that determines the presence of an obstacle in the travelling direction of a subject vehicle and that can suppress a decrease in the accuracy of an obstacle determination.

DESCRIPTION OF EMBODIMENTS

Hereinafter, a specific embodiment of the present invention will be described based on the drawings. In this embodiment, an obstacle determination device that performs a process for determining a solid object that can be an obstacle that a driving subject vehicle should avoid a collision with, and a driving assist system that performs a process for avoiding a collision by using the determination result obtained by the obstacle determination device. The configuration described in the following embodiment illustrates one embodiment of the present invention and does not limit the configuration of the present invention.

Figure 1:
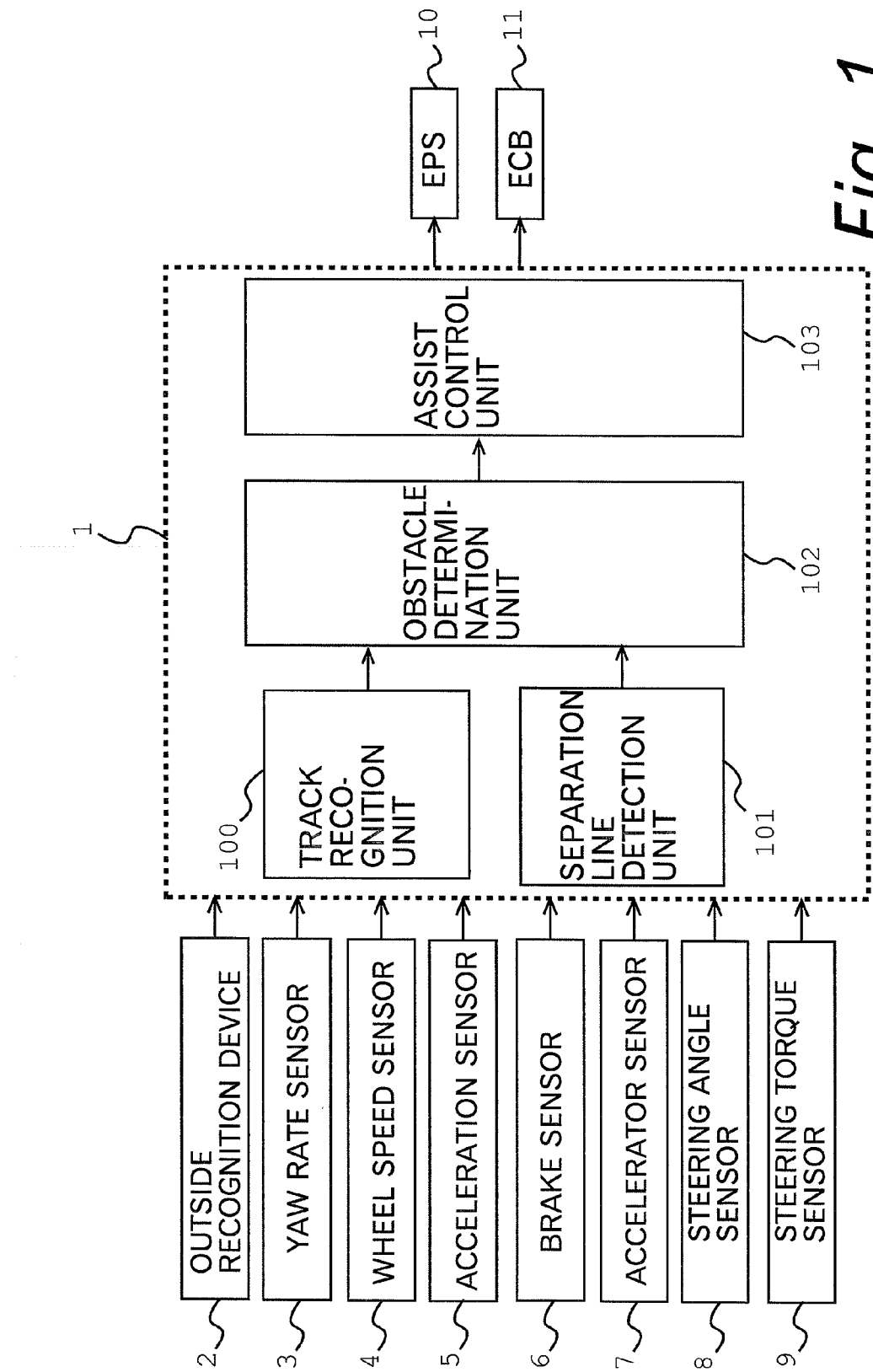
FIG. 1 is a diagram illustrating a configuration of a driving assist system of a vehicle including an obstacle determination device according to the present invention.

FIG. 1 is a block diagram illustrating the functional configurations of an obstacle determination device according to the present invention and a driving assist system of a vehicle including the obstacle determination device. As illustrated in FIG. 1, a control unit (ECU) 1 for various processes is mounted on a vehicle. The ECU 1 is an electronic control unit having a CPU, a ROM, a RAM, a backup RAM, an input/output interface, and the like. Various sensors including an outside recognition device 2, a yaw rate sensor 3, a wheel speed sensor 4, an acceleration sensor 5, a brake sensor 6, an accelerator sensor 7, a steering angle sensor 8, a steering torque sensor 9, and the like are electrically connected to the ECU 1, and the output signals of these sensors are input to the ECU 1.

The outside recognition device 2 includes at least one of measuring devices such as, for example, a LIDAR (laser imaging detection and ranging), a LRF (laser range finder), a millimeter wave radar, a stereo camera, and detects information on a relative position of a subject vehicle (for example, a relative distance or a relative angle) in relation to a solid object present around the vehicle. Moreover, the outside recognition device 2 may include a CCD camera that images a road surface in order to recognize separation lines (in general, white lines or the like) that define a traveling lane along which the subject vehicle travels. When a stereo camera is used for recognizing a solid object, the separation lines on the travelling road surface may be recognized using the camera. Since techniques for detection (recognition of the solid object, recognition of the height of the solid object, and the like) of information on the solid object and detection of separation lines using the outside recognition device 2 are widely known in the related art, the details thereof will not be provided in the present Description. The yaw rate sensor 3 is attached to the body of the subject vehicle, for example, so as to output an electrical signal correlated with the yaw rate acting on the subject vehicle. The wheel speed sensor 4 is a sensor attached to a wheel of the subject vehicle so as to output an electrical signal correlated with a travelling velocity (speed) of the vehicle. The acceleration sensor 5 outputs electrical signals correlated with an acceleration (longitudinal acceleration) acting in a longitudinal direction of the subject vehicle and an acceleration (lateral acceleration) acting in a lateral direction of the subject vehicle. The brake sensor 6 is attached to a brake pedal in a vehicle chamber, for example, so as to output an electrical signal correlated with an operation torque (stepping force) of a brake pedal. The accelerator sensor 7 is attached to, for example, an acceleration pedal in the vehicle interior so as to output an electrical signal correlated with an operation torque (stepping force) of an acceleration pedal. The steering angle sensor 8 is attached to a steering rod that is connected to, for example, a steering wheel in the vehicle interior so as to output an electrical signal correlated with a rotation angle from a neutral position of the steering wheel. The steering torque sensor 9 is attached to the steering rod so as to output an electrical signal correlated with a torque (steering torque) input to the steering wheel.

Moreover, various devices such as an EPS (electric power steering) 10 and an ECB (electronically controlled brake) 11 are connected to the ECU 1. The EPS 10 is a device that assists the steering torque of the steering wheel using a torque generated by an electric motor. The ECB 11 is a device that electrically adjusts an operating hydraulic pressure (brake hydraulic pressure) of the friction brake provided in each wheel.

In the driving assist system illustrated in FIG. 1 having such a configuration, a solid object present in the travelling direction of the subject vehicle is determined as an obstacle based on the information from the sensors and the like connected to the ECU 1, and the ECU 1 electrically controls the EPS 10 and the ECB 11 based on the determination result, thereby driving assist control for avoiding a collision with the obstacle is realized. In other words, the ECU 1 has functions related to the functional blocks illustrated in FIG. 1 so that various devices are controlled in order to determine the presence of an obstacle and avoid a collision using the output signals from the sensors. That is, the ECU 1 includes a track recognition unit 100, a separation line detection unit 101, an obstacle determination unit 102, and an assist control unit 103.

The track recognition unit 100 generates information on a road (track) along which the subject vehicle travels based on the information output from the outside recognition device 2. For example, within a coordinate system having the origin at the position of the subject vehicle, the track recognition unit 100 generates information related to a positional coordinate and a height of each of solid objects (curbs, guard rails, grooves, walls, poles, or the like existing along a lane side) present in the travelling direction of the subject vehicle, and information related to an attitude of the subject vehicle in relation to these solid objects (distance, yaw angle, and the like). The track recognition unit 100 corresponds to a recognition unit according to the present invention.

The separation line detection unit 101 detects a positional coordinate of separation lines such as white lines or yellow lines indicating the boundary of a traveling lane, laid on the road surface of the subject vehicle based on the information output from the outside recognition device 2, and then generates information related to an attitude of the subject vehicle in relation to the separation lines (distance, yaw angle, or the like). The separation line detection unit 101 corresponds to a separation line detection unit according to the present invention.

Moreover, the obstacle determination unit 102 determines whether the solid object recognized by the track recognition unit 100 is an obstacle that the subject vehicle has to avoid a collision with. More specifically, the height of the solid object is compared to a "reference height" that is set based on a relative positional relation of the recognized solid object in relation to the separation lines detected by the separation line detection unit 101. Then it is determined whether the solid object is an obstacle based on the comparison result. The obstacle determination unit 102 corresponds to an obstacle determination unit according to the present invention.

Next, the assist control unit 103 performs driving assist control such as turning, braking, and the like of the subject vehicle with the aid of the EPS 10, the ECB 11, and the like in order to avoid a collision of the subject vehicle with the solid object determined as the obstacle by the obstacle determination unit 102. Specifically, the assist control unit 103 calculates a control amount of the EPS 10 and the ECB 11 and operates the EPS 10 and the ECB 11 according to the calculated control amount. For example, the assist control unit 103 calculates a target yaw rate necessary for avoiding a collision of the subject vehicle with the obstacle and determines a control amount (steering torque) of the EPS 10 and a control amount (brake hydraulic pressure) of the ECB 11 so that an actual yaw rate (the output signal of the yaw rate sensor 3) of the subject vehicle becomes equal to the target yaw rate. In this case, the relation between the target yaw rate and the steering torque, and the relation between the target yaw rate and the brake hydraulic pressure may be mapped in advance.

A method of decelerating a vehicle is not limited to a method of operating the friction brake using the ECB 11. A method of converting the kinetic energy of a vehicle into electric energy (regeneration) and a method of changing the gear ratio of a transmission to increase engine braking may be used. Moreover, a method of changing the yaw rate of the vehicle is not limited to a method of changing the steering angle using the EPS 10. A method of applying different brake hydraulic pressure to the left and right wheels of the subject vehicle may be used.

Figure 2:
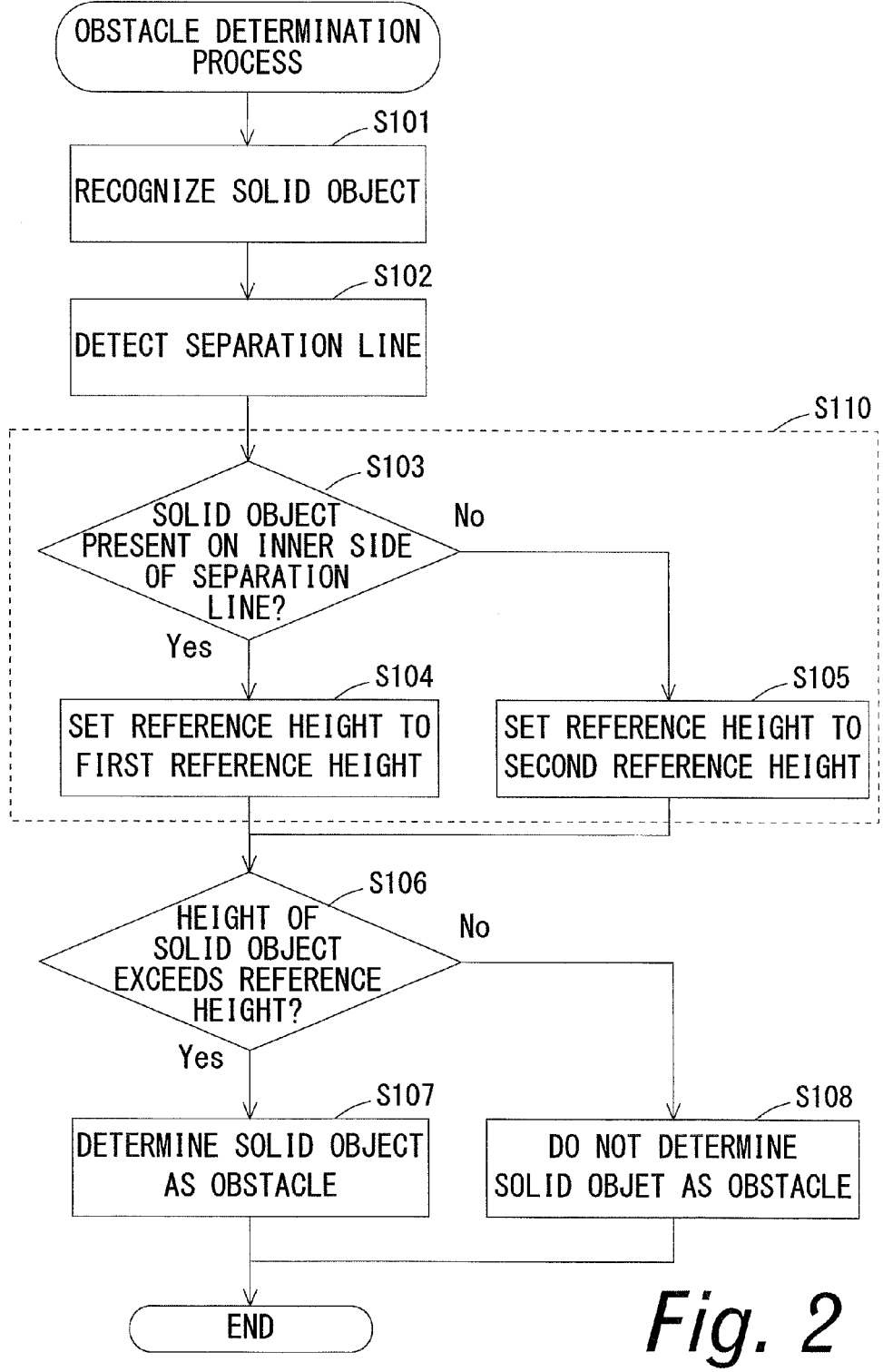
FIG. 2 is a flowchart of an obstacle determination process executed by the obstacle determination device according to the present invention.

In the driving assist system illustrated in FIG. 1 having such a configuration, the track recognition unit 100, the separation line detection unit 101, and the obstacle determination unit 102 form the obstacle determination device according to the present invention. The driving assist system performs driving assistance for avoiding a collision of the subject vehicle with the obstacle based on the determination result obtained by the obstacle determination device. Here, an obstacle determination process executed by the obstacle determination device will be described based on FIG. 2. The process illustrated in FIG. 2 is a process routine repeatedly executed by the ECU 1 and is stored as a control program in advance in the ROM or the like of the ECU 1. First, in S101, the track recognition unit 100 recognizes a solid object present in the travelling direction of the subject vehicle. That is, the ECU 1 generates information related to a positional coordinate and a height of a solid object present in the travelling direction of the subject vehicle in the coordinate system having the origin at the position of the subject vehicle, together with information related to an attitude of the subject vehicle in relation to the solid object. When the process of S101 ends, the flow proceeds to S102. In S102, the separation line detection unit 101 detects separation lines (white lines or the like) appearing on the lateral sides of the subject vehicle. That is, the ECU 1 generates a positional coordinate of the separation lines in the coordinate system having the origin at the position of the subject vehicle, as described above. When the process of S102 ends, the flow proceeds to S103.

In S103, it is determined whether the solid object recognized in S101 is present on the inside of the separation lines detected in S102. The inside of the separation lines referred herein means a region which is defined by the separation lines and in which the subject vehicle travels, namely a traveling lane. Thus, S103 can be said to be a process of determining whether the recognized solid object is present on the inside of the traveling lane. Here in S103, the flow proceeds to S104 when an affirmative determination is made and the flow proceeds to S105 when a negative determination is made.

In S104, the reference height used for determining the obstacle by the obstacle determination unit 102 is set to a first reference height, as explained above, based on the determination result in S103 that the recognized solid object is present on the inside of the traveling lane of the subject vehicle. The first reference height is a reference value which is set with the assumption that, in principle, no obstacle is present on the inside of the traveling lane of a vehicle, while if present, a relatively tall obstacle is present. Thus, the first reference height is higher than a second reference height described later. On the other hand, in S105 a reference height used for determining the obstacle by the obstacle determination unit 102 is set to a second reference height, as explained above, based on the determination result in S103 that the recognized solid object is present on the outside of the traveling lane of the subject vehicle. The second reference height is a reference value which is set with the assumption that a relatively short obstacle such as a curb or a guard rail may be present on the outside of the traveling lane of a vehicle. Thus, the second reference height is different from and is set to be lower than the first reference height. When the process of S104 or S105 ends, the flow proceeds to S106.

In S106, it is determined whether the height of the recognized solid object exceeds the reference height. That is, when the first reference height is set as the reference height in S104, it is determined in S106 whether the height of the solid object exceeds the first reference height. When the second reference height is set as the reference height in S105, it is determined in S106 whether the height of the solid object exceeds the second reference height. When a affirmative determination is made in S106, the flow proceeds to S107 and it is determined that the solid object is an obstacle that is to be avoided. When a negative determination is made in S106, the flow proceeds to S108 and it is determined that the solid object is not an obstacle.

In the obstacle determination process performed in this manner, the reference height used for the obstacle determination is set as any one of the first reference height and the second reference height depending on whether the recognized solid object is present on the inside of the separation lines, namely the inside of the traveling lane of the subject vehicle. In other words, the reference height is switched based on the relative positional relation between the solid object and the separation lines that define the traveling lane. When the reference height is set to the second reference height, it is possible to determine a relatively short solid object as an obstacle, because the second reference height is lower than the first reference height. In other words, the reference height is set so that the solid object is more likely to be determined as an obstacle. However, by making it more likely to determine a short solid object as an obstacle, the possibility of an erroneous determination, in which a solid object that is not needed to be determined as an obstacle is determined as an obstacle, may become high. However, in the obstacle determination process as described above, the obstacle determination based on the second reference height is performed only when the recognized solid object is not present on the inside of the separation lines (when the recognized solid object is present on the outside of the separation lines). Thus, the chances of making an erroneous determination can be limited. The accuracy of the obstacle determination by the obstacle determination device can, therefore, be increased.

In the obstacle determination process, the processes of S103 to S108 are executed by the obstacle determination unit 102. Here, the separation line detection unit 101 may not be able to always detect separation lines on both left and right sides of the subject vehicle, thus two separation lines in total, depending on a state of travel or the like of the subject vehicle. Thus, it may be difficult to specify the traveling lane of the subject vehicle precisely. An embodiment of performing a process corresponding to the determination process of S103 and the processes of S104 and S105 (hereinafter, these processes are collectively referred to as a "reference height setting process" and are denoted by reference numeral S110 in FIG. 2) depending on a state of the detected separation line will be described in detail based on FIG. 3 and FIGS. 4A to 4C.

Figure 3:
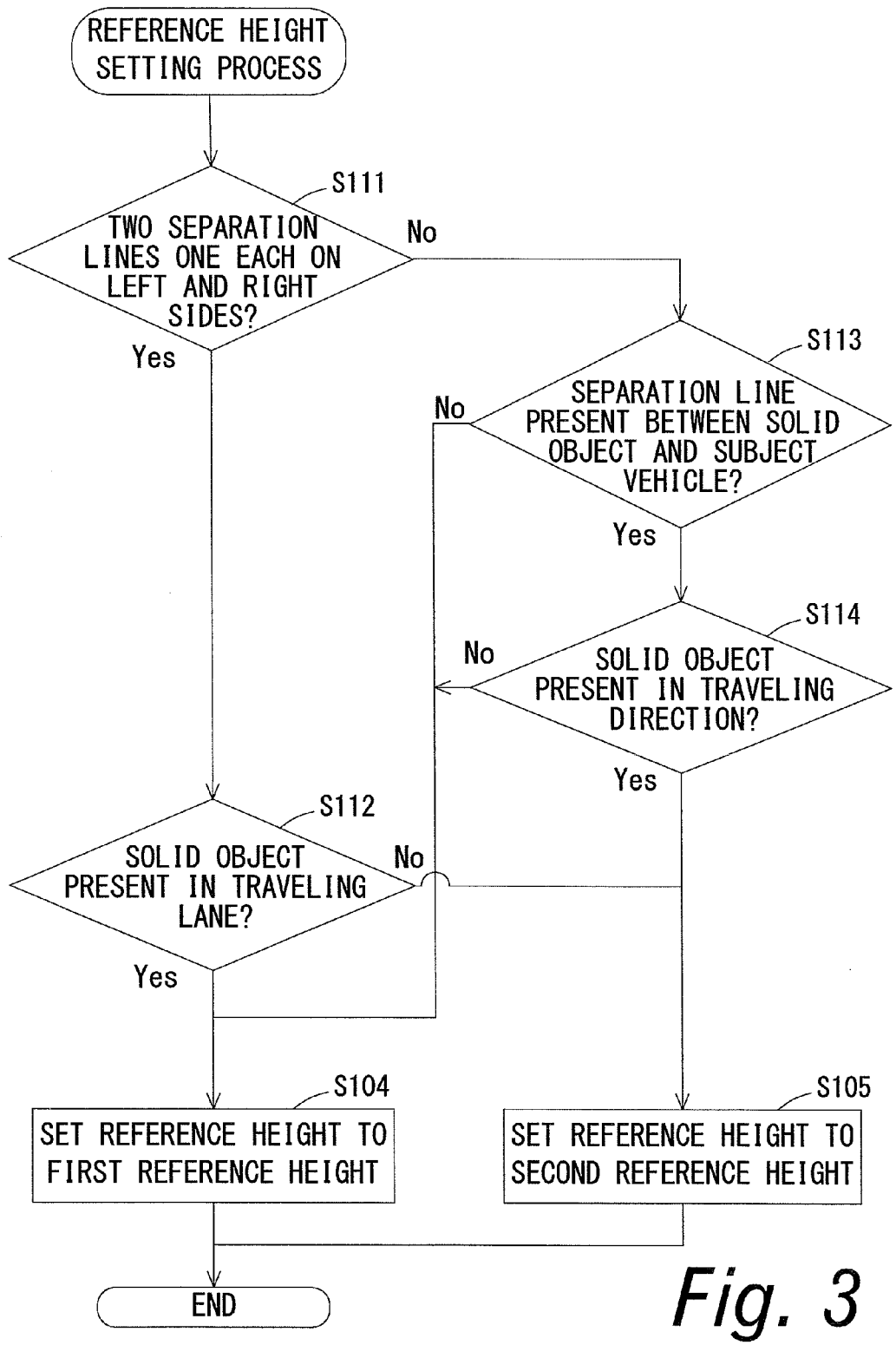
FIG. 3 is a flowchart illustrating the details of a reference height setting process included in the obstacle determination process illustrated in FIG. 2.

FIG. 3 is a flowchart of the reference height setting process and illustrates more specifically the flow of the process corresponding to S110 of the obstacle determination process illustrated in FIG. 2. The processes of S111 to S114 of FIG. 3 correspond to the process of S103 illustrated FIG. 2, and the reference height is set in S104 or S105 based on the result of the processes of S111 to S114. More specifically, first, in S111, it is determined whether the separation lines detected in S102 of the obstacle determination process are existing one each on left and right sides of the subject vehicle to make a total of two. That is, it is determined whether a traveling lane along which the subject vehicle travels is in a state that it can be clearly specified by two separation lines. The flow proceeds to S112 when an affirmative determination is made in S111 while the flow proceeds to S113 when a negative determination is made.

Figure 4A:
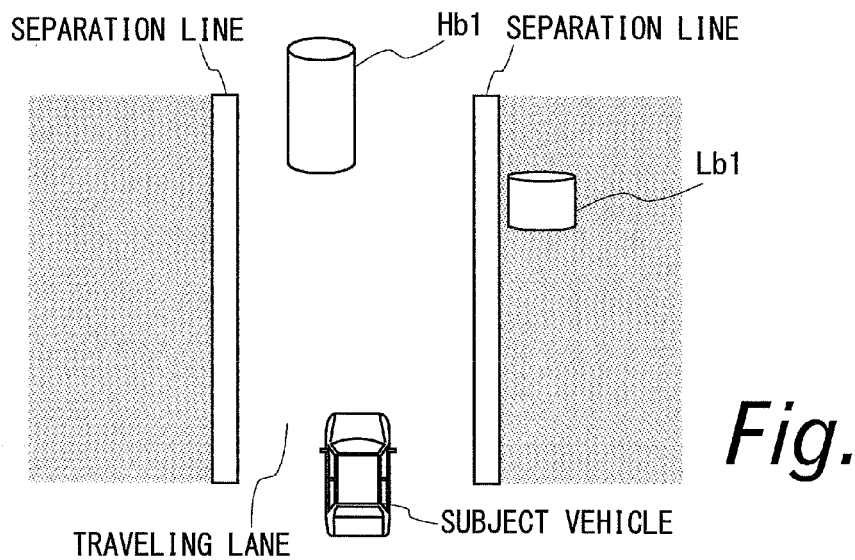
FIG. 4A is a first diagram illustrating a relative positional relation among a travelling subject vehicle, white lines defining a traveling lane along which the subject vehicle travels, and a recognized solid object.

When the flow proceeds to S112, it is determined, according to the affirmative determination in S111, that the state is such that the traveling lane of the subject vehicle can be clearly specified by the detected separation lines as illustrated in FIG. 4A. Thus, when the solid object is present on the inside of the traveling lane (the solid object Hb1 in FIG. 4A), no separation line is present between the subject vehicle and the solid object Hb1. On the other hand, when the solid object is present on the outside of the traveling lane (the solid object Lb1 in FIG. 4A), a separation line is present between the subject vehicle and the solid object Lb1. In S112, it is determined whether the recognized solid object is present in the traveling lane of the subject vehicle, formed by being interposed between the two separation lines. When an affirmative determination is made in S112, the flow proceeds to S104 and the reference height is set to the first reference height. While, when a negative determination is made in S112, the flow proceeds to S105 and the reference height is set to the second reference height. As a result, as illustrated in FIG. 4A, a relatively short solid object is determined as an obstacle only when the solid object is positioned on the outside of the traveling lane, like the solid object Lb1. As for a solid object present on the inside of the traveling lane, only a relatively tall solid object (a solid object like the solid object Hb1) having a height exceeding the first reference height is determined as the obstacle.

Figure 4B:
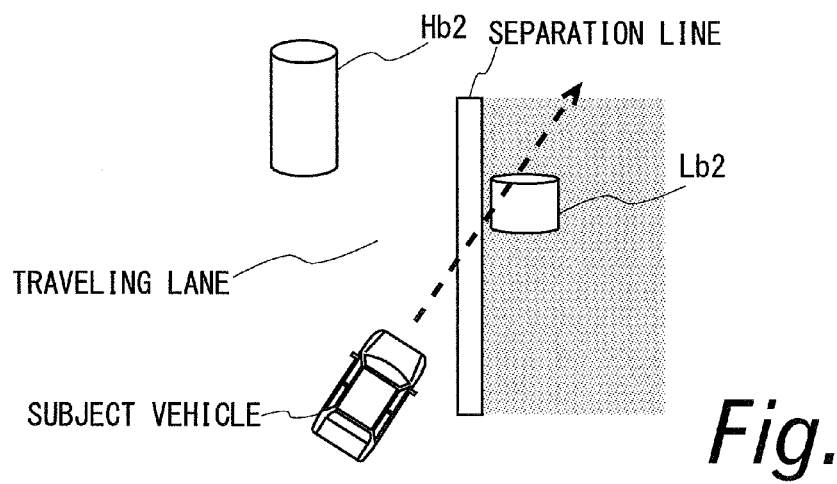
FIG. 4B is a second diagram illustrating a relative positional relation among a travelling subject vehicle, a white line defining a traveling lane along which the subject vehicle travels, and a recognized solid object.
Figure 4C:
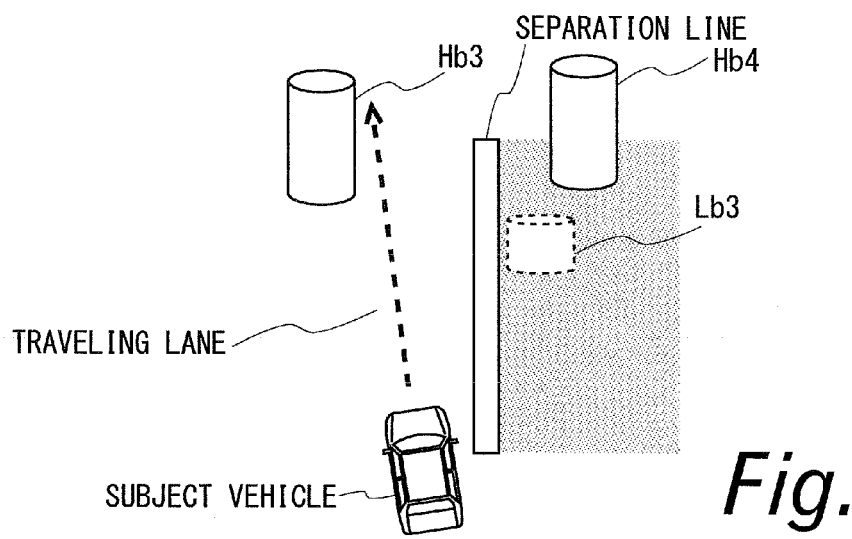
FIG. 4C is a third diagram illustrating a relative positional relation among a travelling subject vehicle, a white line defining a traveling lane along which the subject vehicle travels, and a recognized solid object.

When the flow proceeds to S113, it is determined, according to the negative determination in S111, that the state is such that the traveling lane of the subject vehicle cannot be clearly specified by the detected separation line as illustrated in FIG. 4B or 4C. Thus, in such a case, it is determined whether the recognized solid object is present on the inside or the outside of the traveling lane depending on whether a white line is present between the subject vehicle and the solid object. For example, when no separation line is present between the subject vehicle and the solid object like the solid object Hb2 of FIG. 4B, it is assumed that the solid object Hb2 is present on the inside of the traveling lane. On the other hand, when a separation line is present between the subject vehicle and the solid object like the solid object Lb2 of FIG. 4B, it is assumed that the solid object Lb2 is present on the outside of the traveling lane. By making such assumptions, even when it is not possible for the separation line detection unit 102 to detect the separation line sufficiently, the obstacle determination process illustrated in FIG. 2 and the reference height setting process illustrated in FIG. 3 can be executed stably.

Based on the above, in S113, it is determined whether a separation line is present between the recognized solid object and the subject vehicle. When an affirmative determination is made in S113, the flow proceeds to S114. On the other hand, when a negative determination is made in S113, the flow proceeds to S104, and the reference height is set to the first reference height as described above. When the flow proceeds to S104 in this manner, it means that the solid object is present in the traveling lane of the subject vehicle. However, in this case, as illustrated in FIG. 4B or 4C, as for a solid object present in the traveling lane of the subject vehicle, only a relatively tall solid object (the solid objects like the solid objects Hb2 and Hb3) is determined as an obstacle. As a result, it is possible to obviate an obstacle determination of a short solid object, in which an erroneous determination is likely to be made.

Here, when the flow proceeds to S114, it is determined, according to the affirmative determination in S113, that the state is such that the recognized solid object is positioned on the outside of the traveling lane like the solid object Lb2 in FIG. 4B. In such a case, in the present embodiment, it is further determined whether the recognized solid object is present in the travelling direction of the subject vehicle (process of S114). When the solid object is present in the travelling direction of the subject vehicle, even if the solid object is positioned on the outside of the traveling lane, it is highly probable that, if the subject vehicle deviates from the traveling lane, the subject vehicle collides with the solid object. Conversely, when the solid object is not present in the travelling direction of the subject vehicle, it is less probable that the subject vehicle collides with the solid object. This means there is a margin for a requirement to determine a solid object as an obstacle (i.e. the reference height) to be less strict. Based on the above, when a negative determination is made in S114 (i.e. when it is determined that the possibility of a collision with the solid object is low), the flow proceeds to S104, and the reference height is set to the first reference height as described above. On the other hand, when an affirmative determination is made in S114 (i.e. when it is determined that the possibility of a collision with the solid object is high), the flow proceeds to S105, and the reference height is set to the second reference height as described above.

The travelling direction of the subject vehicle can be appropriately specified according to the conventional technique. For example, a present lateral acceleration Gy0 of the subject vehicle may be acquired from the output signal of the acceleration sensor 5. And when assumed that the subject vehicle travels upon maintaining the present lateral acceleration Gy0, a path along which the subject vehicle is expected to follow may be specified as the travelling direction of the subject vehicle. And when a solid object positioned on the outside of the traveling lane is present in a strip-shaped region having a certain width and its center along the travelling direction of the subject vehicle, it may be determined that "the solid object is present in the travelling direction of the subject vehicle". In the present embodiment, the travelling direction of the subject vehicle is depicted by broken-line arrow in FIGS. 4B and 4C.

When a negative determination is made in S114, the flow proceeds to S104, and the first reference height is set as the reference height. In this case, as illustrated in FIG. 4C, as for a solid object present on the outside of the traveling lane of the subject vehicle, a relatively tall solid object (the solid object like the solid object Hb4) having a height exceeding the first reference height is determined as an obstacle. Whereas a relatively short solid object (the solid object like the solid object Lb3) having a height not exceeding the first reference height is not determined as an obstacle. Moreover, when an affirmative determination is made in S114, the flow proceeds to S105, and the second reference height is set as the reference height. In this case, as illustrated in FIG. 4B, as for a solid object present on the outside of the traveling lane of the subject vehicle, a relatively short solid object (the solid object like the solid object Lb2) is also determined as an obstacle. This is to detect the presence of a solid object rather than obviating erroneous determinations based on such a relative positional relation that the solid object Lb2 and the subject vehicle are highly probable to collide with each other and to prioritize the subsequent driving assist control.

As described above, according to the reference height setting process illustrated in FIG. 3, the reference height for making an obstacle determination can be appropriately set according to the state of the separation line detected by the separation line detection unit 101. As a result, in the obstacle determination process illustrated in FIG. 2, it is possible to appropriately determine the presence of an obstacle that is to be avoided from a collision while suppressing erroneous determinations as much as possible.

In the reference height setting process illustrated in FIG. 3, the separation line presence determination in S113 and the solid object presence determination in S114 are performed in this order. The order of both determination processes, however, may be reverse to the order illustrated in FIG. 3. Moreover, in the reference height setting process illustrated in FIG. 3, when a negative determination is made in the determination process of S114, the flow proceeds to S104, and the reference height is set to the first reference height. Alternatively, the flow may proceed to S105 regardless of the result of the determination process in S114, and the reference height may be set to the second reference height. In other words, the determination process of S114 may be omitted substantially. Thus, in this case, when one separation line is detected and this separation line is present between the detected solid object and the subject vehicle, the reference height is set to the second reference height. When the separation line is not present between the detected solid object and the subject vehicle, the reference height is set to the first reference height.

<Modification>

In the reference height setting process illustrated in FIG. 3, when one separation line is detected, the separation line presence determination in S113 and the solid object presence determination in S114 are performed. In S114, it is determined whether the solid object is present in the travelling direction of the subject vehicle as described above, thereby the reference height is set taking the possibility of a collision between the solid object and the subject vehicle into account. As a modification of such a way of setting the reference height based on the possibility of a collision, instead of the process of S114, a process to determine whether "the detected separation line is present in the travelling direction of the subject vehicle" or "the detected separation line crosses the separation line of the subject vehicle" may be performed. When an affirmative determination is made in such determination processes, it can be reasonably determined that the possibility of a collision of the subject vehicle is high, and thus the flow proceeds to S105. On the other hand, when a negative determination is made in such determination processes, it can be reasonably determined that the possibility of a collision of the subject vehicle is low, and thus the flow proceeds to S104. In this modification, any of the determination process of S113 and the determination process which substitutes the process of S114 can be performed first.

<Driving Assist Process>

Figure 5:
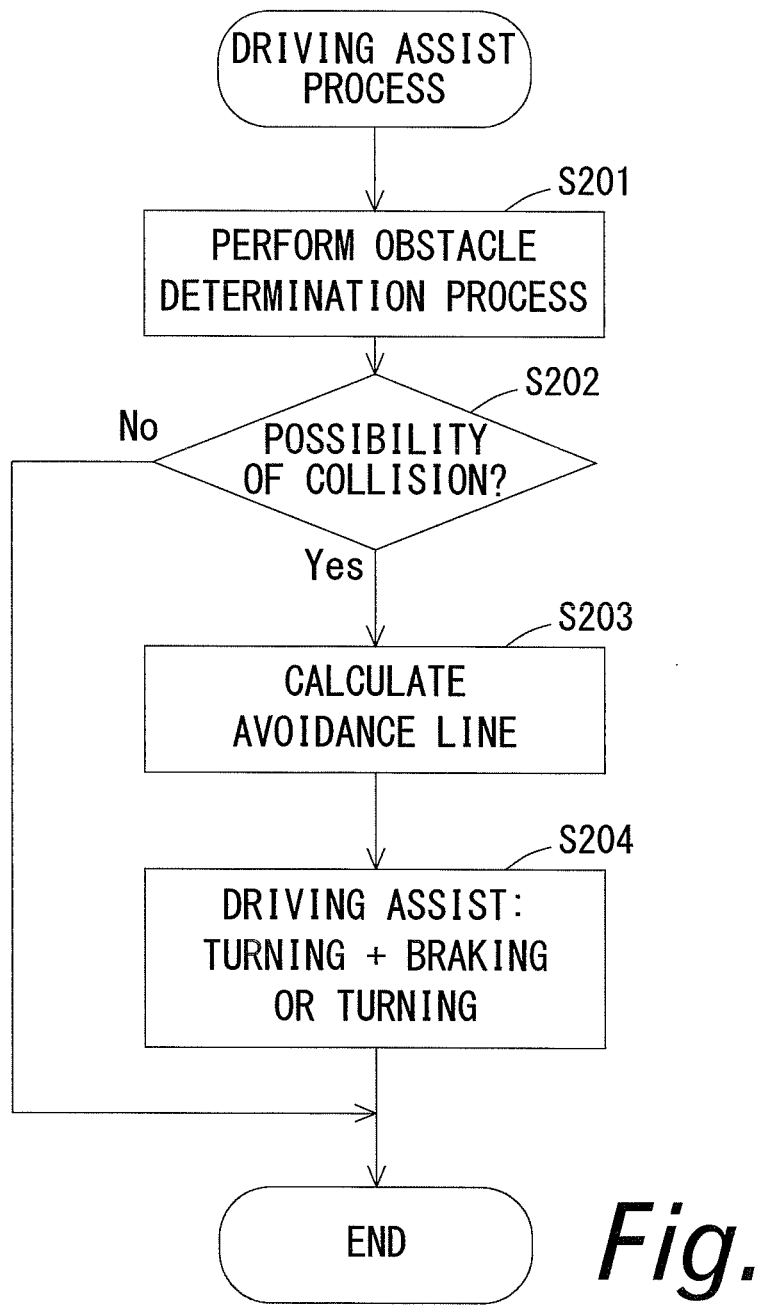
FIG. 5 is a flowchart of a driving assist process for avoiding a collision of a subject vehicle with a determined obstacle, including the obstacle determination process illustrated in FIG. 2.

A driving assist process for avoiding a collision between the subject vehicle and the obstacle using the determination result obtained in the obstacle determination process described above will be described based on FIG. 5. The driving assist process is mainly executed by the assist control unit 103.

First, in S201, the obstacle determination process is performed, and then, the flow proceeds to S202. In S202, it is determined whether the result of the obstacle determination process shows that the subject vehicle is likely to collide with the solid object determined as an obstacle. Specifically, the possibility of a collision is determined based on whether an obstacle is present in the travelling direction of the subject vehicle. The travelling direction of the subject vehicle is determined in the above-described manner. When an affirmative determination is made in S202, the flow proceeds to S203, whereas when a negative determination is made, the driving assist process is ended.

In S203, an avoidance line along which the subject vehicle has to travel in order to avoid a solid object (obstacle) that the subject vehicle is likely to collide with is calculated. Specifically, a present lateral acceleration Gy0 of the subject vehicle is read using the acceleration sensor 5. Then, the lateral acceleration is increased or decreased by a predetermined amount ΔGy from the read lateral acceleration Gy0 to calculate a travelling range in which the subject vehicle may travel. Then, the avoidance line is determined by taking the degree of an overlap between the solid object and the travelling range into consideration. When the process of S203 ends, the flow proceeds to S204.

In S204, in order to avoid a collision between the subject vehicle and the solid object (obstacle), the EPS 10 changes the steering angle or different brake hydraulic pressures are applied to the left and right wheels of the subject vehicle to turn the subject vehicle so that the subject vehicle follows the avoidance line calculated in S203. Alternatively, in addition to the turning, the ECB 11 may control the braking force to decelerate the subject vehicle so as to avoid a collision with the solid object more safely. Moreover, together with or instead of the control of the EPS and the ECB 11, a warning device (not illustrated) may alert the driver to the possibility of a collision.

REFERENCE SIGNS LIST

1: ECU
2: outside recognition device
3: yaw rate sensor
4: wheel velocity sensor
5: acceleration sensor
6: brake sensor
7: accelerator sensor
8: steering angle sensor
9: steering torque sensor
10: EPS (electric power steering)
11: ECB (electronically controlled brake)
100: track recognition unit
101: separation line detection unit
102: obstacle determination unit
103: assist control unit

The invention claimed is:

1. An obstacle determination device that determines whether a solid object present in a travelling direction of a subject vehicle is an obstacle that the vehicle should avoid, the obstacle determination device comprising:
   a recognition unit that recognizes a solid object present in the travelling direction of the subject vehicle;
   a separation line detection unit that detects a separation line on a road indicating a boundary of a traveling lane of the subject vehicle; and
   an obstacle determination unit that determines whether the solid object is an obstacle by comparing a height of the solid object recognized by the recognition unit to a reference height, wherein
   the reference height is set, based on a relative positional relation between the separation line detected by the separation line detection unit and the solid object recognized by the recognition unit, such that the reference height is lower when the separation line is present between the solid object and the subject vehicle, as compared to when the separation line is not present between the solid object and the subject vehicle.

2. The obstacle determination device according to claim 1, wherein
   when at least one separation line is detected by the separation line detection unit, the reference height is set to a first reference height in a case where the separation line is not present between the solid object and the subject vehicle, and the reference height is set to a second reference height that is lower than the first reference height in a case where the separation line is present between the solid object and the subject vehicle.

3. The obstacle determination device according to claim 2, wherein
   when the separation line detection unit detects two separation lines, one on each left and right sides of the subject vehicle, the reference height is set to the first reference height in a case where the solid object is present in a region between the two separation lines, and the reference height is set to the second reference height in a case where the solid object is not present in the region between the two separation lines.

4. The obstacle determination device according to claim 2, wherein
when the separation line detection unit detects, on any one of left and right sides of the subject vehicle, one separation line in between the subject vehicle and the solid object, the reference height for an obstacle determination of the solid object is changed based on whether the solid object is positioned in the travelling direction of the subject vehicle.

5. The obstacle determination device according to claim 4, wherein
when the solid object is positioned in the travelling direction of the subject vehicle, the reference height is set to the second reference height.

6. The obstacle determination device according to claim 2, wherein
when the separation line detection unit detects, on any one of left and right sides of the subject vehicle, one separation line in between the subject vehicle and the solid object, the reference height for determining whether the solid object is an obstacle is changed based on whether the detected separation line is positioned in the travelling direction of the subject vehicle.

* * * * *